No. 707,977.  
T. D. RADCLIFFE.  
WHEELED SCRAPER OR SCOOP.  
(Application filed Dec. 7, 1901.)  
Patented Aug. 26, 1902.
(No Model.)
2 Sheets—Sheet 1.
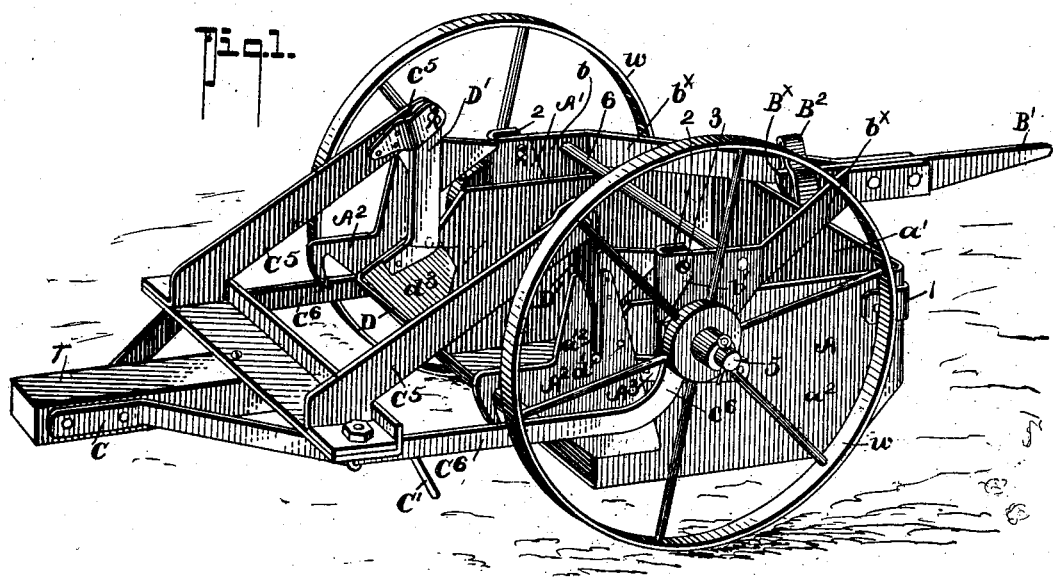
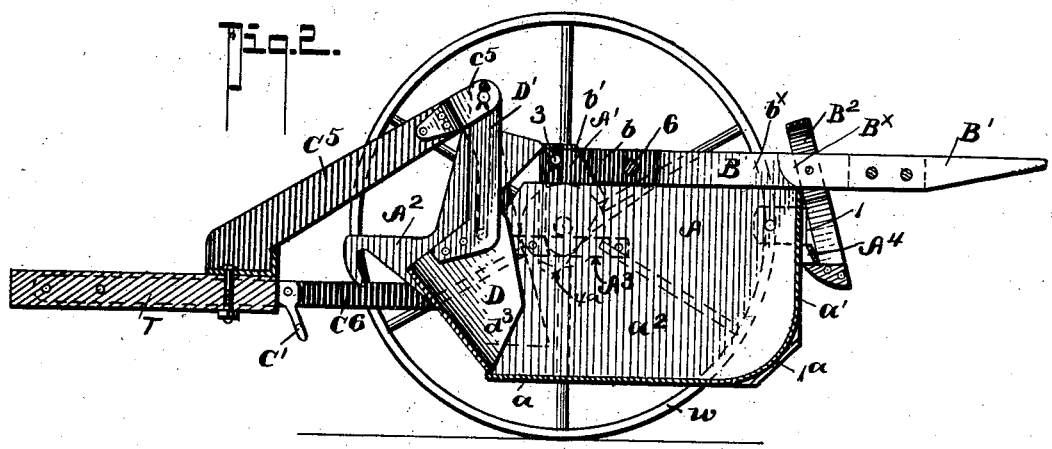
WITNESSES:
INVENTOR  
Thomas D. Radcliffe.  
BY  
ATTORNEYS

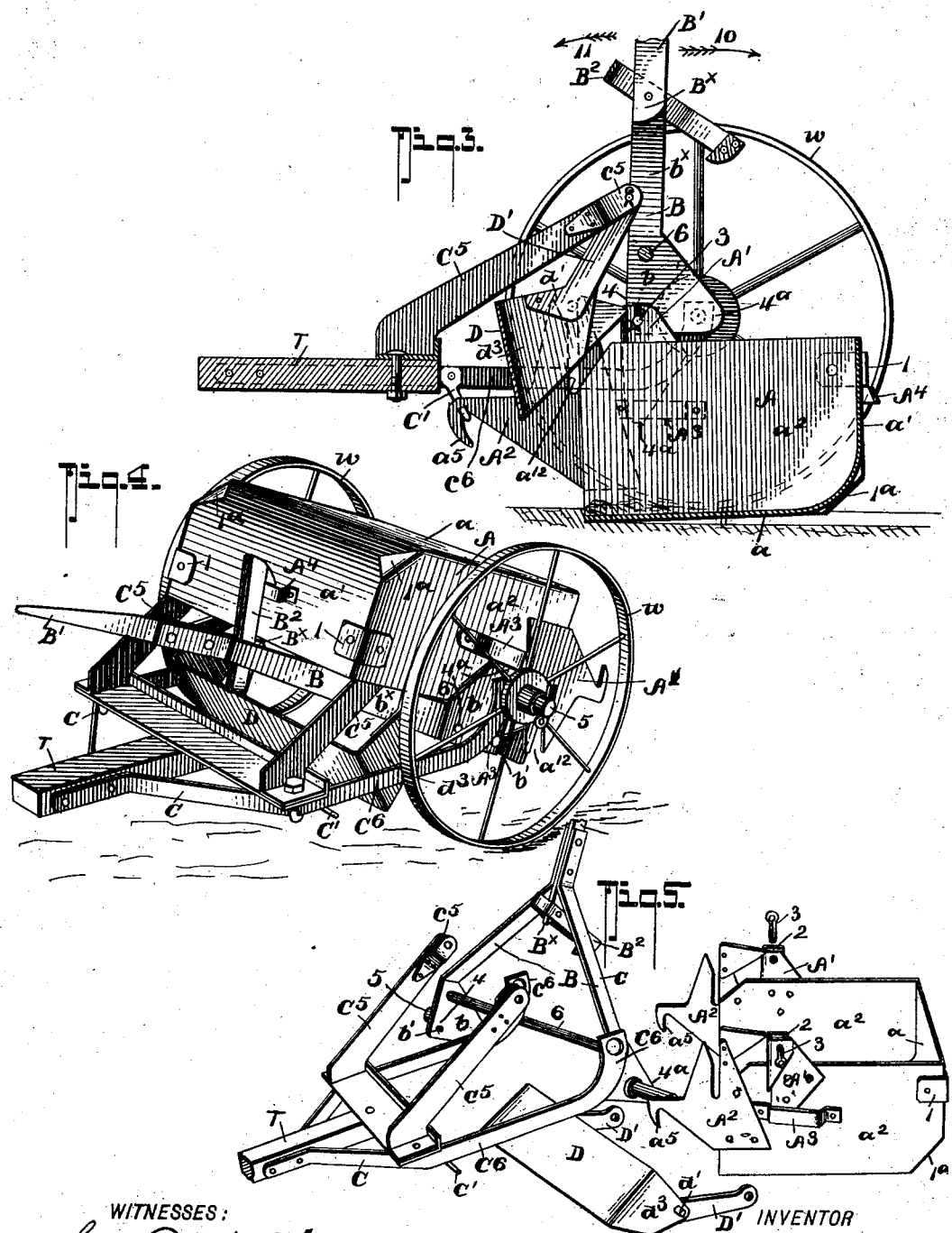

UNITED STATES PATENT OFFICE.

THOMAS D. RADCLIFFE, OF LAWRENCE, KANSAS, ASSIGNOR OF ONE-THIRD TO CHARLES RICH METCALF, OF LAWRENCE, KANSAS.

WHEELED SCRAPER OR SCOOP.

SPECIFICATION forming part of Letters Patent No. 707,977, dated August 26, 1902.

Application filed December 7, 1901. Serial No. 84,991. (No model.)

*To all whom it may concern:*

Be it known that I, THOMAS D. RADCLIFFE, residing at Lawrence, in the county of Douglas and State of Kansas, have invented certain new and useful Improvements in Wheeled Scrapers or Scoops, of which the following is a specification.

My present invention, which relates to that class of wheeled scrapers having a dumping pan or scoop, more especially seeks to provide certain improvements in the forms of wheeled scrapers disclosed in my pending applications Serial No. 80,948, filed November 2, 1901, and Serial No. 82,024, filed November 12, 1901.

My present invention seeks to provide a simple, economical, and easily-manipulated wheeled scraper in which the several parts have such coöperative connection and combination, whereby the interlocking of the pan, the end, and the draft devices can be conveniently effected and maintained in such manner as to provide for a very effective digging or scooping operation, and in which the tilting devices are so disposed that the operator can easily and without much effort dump the scoop to unload, and in which the several parts can be quickly adjusted or returned to their normal or transporting position.

With these and other objects in view, which hereinafter will appear, my invention consists in certain novel details of construction and peculiar combination of parts, all of which will hereinafter be fully described and specifically pointed out in the appended claims, reference being had to the accompanying drawings, in which—

Figure 1 is a perspective view of my improved wheeled scraper, the parts being in their normal or transporting position, the endgate being closed. Fig. 2 is a longitudinal section thereof, the parts being as in Fig. 1. Fig. 3 is a view illustrating my invention, the parts thereof being adjusted to a "loading" position. Fig. 4 is a view showing my improved wheeled scraper in a dumped position. Fig. 5 is a perspective view of the several parts constituting my improved wheeled scraper as detached from each other.

In my present construction of wheeled scraper the same includes a pan or scoop having substantially the same shape of the pan shown in my other applications, above referred to, and in the present case the pan (designated by A) is also bent up into the desired shape from a single sheet-metal body comprising a bottom or scraper part $a$, the back $a'$ bent vertically, and the sides $a^2$, the latter and the back members being braced by angle-plates 1 and the end laps or ears $1^a$, as best seen in Fig. 4.

$A'$ $A'$ designate what I term "pan-lift" brackets, one for each side of the pan. These brackets are riveted to the pan side at points in advance of the center of the pan, the purpose of which will presently appear, and each bracket $A'$ extends above the upper edge of the pan and has its upper end formed with a bifurcated port 2, apertured to receive the pivot-bolts 3, as shown. At a point just below the brackets $A'$ and at each side of the pan is secured a stay or foot-brace $A^3$, the purpose of which will also be presently explained.

B designates a combined axle-supporting and pan-lifting frame which consists of the pendent brackets $b$, each of which has its upper front edge apertured, as at $b'$, to receive the pivot-bolts 3, upon which the said brackets $b$ are pivotally mounted. As best seen in Figs. 2, 3, and 5, the brackets $b$ are made of substantially triangular shape and with the pivoted end $b'$ and end $4^a$ correlatively so arranged that when the frame B is swung down to a horizontal position, as in Fig. 1, the end $4^a$ will sweep into and engage with the foot-braces $A^3$ and by reason thereof swing the pan forward and upward from the scraping position (shown in Fig. 3) to the carrying position, (shown in Fig. 1,) as will hereinafter be further explained. Each bracket $b$ has fixedly formed therewith a stub-axle 5 5, which, it will be noticed, are disposed to the rear of the pivotal points of the said brackets $b$, and on said axles are fitted the wheels $w$ $w$, as shown. To brace the frame B, the side brackets $b$ $b$ thereof are joined by a cross-rod 6, and the said brackets are further braced by reason of the side extensions $b^\times$ $b^\times$ of the frame extending at an angle and joining with the handle member $B'$, which has a forwardly-extending portion $B^\times$, upon which is pivotally suspended the gravity-operating or lifting latch $B^2$, adapted to engage with the pan-catch $A^4$, secured to the back of the pan. (See Fig. 2.)

$A^2$ $A^2$ designate pan, draft-hook, and end-gate guide members, one of which is permanently secured to the front end of each side of the pan or scoop A, and the said members $A^2$ each have a vertical slot $a^{12}$ in the upper end in a plane with the front edge of the scoop to receive and form guideways for the studs $d'$, projected laterally from the side portions $D^3$ $D^3$ of the end-gate D, and the said members are also formed with horizontally-disposed forwardly-extending hooks $a^5$ for engaging the latch members $C'$ $C'$ on the draft-frame side arms $C^6$ in the manner and for the purpose presently explained, and the said hooks $a^5$ in the practical construction of my present wheeled scraper are disposed about six inches in advance of the slots $a^{12}$, the reason of which will also be hereinafter explained.

The draft-frame in my present construction includes a transversely-extending tongue-frame metal brace-bar C, which is bolted on the inner end of the tongue T and to the converging portions of the side arms $C^6$, which connect with the said tongue T and have their inner ends turned up, as at $c^6$, and apertured to pivotally hang on the stub-axles, as shown.

$C^5$ designates supporting-arms fixedly secured at their lower end to the brace-bar C and extend rearwardly and upwardly at an acute angle to the side bars $C^6$, their upper ends having pivot-bearings $c^5$ to receive the upper ends of the side arms or hangers $D'$ of the end-gate D.

From the foregoing description, taken in connection with the accompanying drawings, it is thought the complete construction and the advantages of my invention will be readily understood by those skilled in the art to which it appertains. Its operation is simple and is best explained as follows: The several parts being in the position shown in Fig. 3, ready for scraping or digging, in which the gate is swung back, and the pan having been filled, the operator to bring the pan in position for transportation pulls the handle $B'$ and the frame B down in the direction indicated by arrow 10, and in this movement the lower ends of brackets $b$ engage the foot-braces $A^3$, and in doing so they lift the pan and disengage the hooks $a^5$ in engagement with latches $c'$ $c'$ on the draft side arms $C^6$, and at the same time by reason of the studs $d$ on the pan D engaging the sides of the slots $a^{12}$, the pan D will be held to close over the front end of the pan or scoop to hold the parts in position, as in Fig. 1, to convey the load. The frame B when turned in the direction indicated has its hook $B^2$ passed over the back of the scoop or pan to engage the pan-latch $A^4$, and by reason of such coöperative adjustment of the several parts it is manifest that to dump the load it is only necessary to swing the handle $B'$, with the frame B, back in the direction of the arrow 20, which movement will turn the parts over to the position shown in Fig. 4.

Having thus described my invention, what I claim, and desire to secure by Letters Patent, is—

1. A wheeled scraper, comprising in combination, a pan, an end-gate closable over the front of the pan, a draft-frame upon which the gate is pivotally suspended, a pan-shifting and wheel-supporting frame, having stub-axles, and pivotally connected with the pan at a point in advance of its axles, and having a member for engaging the pan to lift it and move it forward, and interlocking devices controlled by the forward lift movement of the pan for effecting a closure of the end-gate, as the pan is lifted and moved forward, as set forth.

2. A wheeled scraper, comprising in combination with a lift-frame the supporting-wheels, the vertically and forwardly movable pan, pivotally suspended from said frame, and the draft-frame pivotally hung on the axles; of the independently-movable end-gate pivotally suspended from the draft-frame, and mechanism coöperatively connected with the pan and draft-frame controlled by the upward and forward swing of the pan for shifting said end-gate to its closure position, when the pan is elevated for transportation, as set forth.

3. The combination with the pan, a lift-frame having side arms pivotally connected with the pan at a point in advance of the axles, said arms having the wheel-carrying axles projected therefrom a draft-frame pivotally joined with the axles, an independently-movable end-gate pivotally suspended from the said draft-frame, latch-hooks on the pan, latches on the draft-frame, and means for moving the said hooks and pan to an interlocking position, substantially as shown and for the purposes described.

4. The combination with the frame B, including the side members $b$, and the stub-axles projected from said members; of the pan pivotally suspended from the members $b$ at a point in advance of the axles, latch-engaging hooks projected forwardly from the pan and secured thereto, and heel-braces on the pan in the path of the swing movement of the members $b$; of the draft-frame C pivotally secured to the axles, the end-gate D, pivotally suspended from the frame B, latches on the frame C for engaging the pan-hooks, and means for swinging the end-gate to its closed position as the pan is lifted and swung forward by the action of the frame B, substantially as shown and for the purposes described.

THOMAS D. RADCLIFFE.

Witnesses:
 LEWIS S. STEELE,
 FRED G. DIETERICH.